United States Patent
Rudowicz et al.

[11] Patent Number: 6,052,561
[45] Date of Patent: Apr. 18, 2000

[54] LOCATION METHOD FOR A ELECTIVE CALL RECEIVER OPERATING IN A SATELLITE COMMUNICATION SYSTEM

[76] Inventors: Michael James Rudowicz, 7550 Lauden Dr., Lake Worth, Fla. 33467; James Joseph Aloi, 10677 High Beam Ct., Columbia, Md. 21044

[21] Appl. No.: 09/028,043

[22] Filed: Feb. 23, 1998

[51] Int. Cl.$^7$ .............................. H04B 7/185; G01S 5/02
[52] U.S. Cl. .................... 455/13.1; 455/456; 342/357.16
[58] Field of Search .................... 455/12.1, 456, 455/67.6, 13.1, 343, 574, 38.3; 342/357.01, 450, 357.1, 357.16

[56] References Cited

U.S. PATENT DOCUMENTS

| | | | |
|---|---|---|---|
| 5,222,099 | 6/1993 | Hori et al. | 455/12.1 |
| 5,552,795 | 9/1996 | Tayloe et al. | 455/456 |
| 5,596,315 | 1/1997 | Olds et al. | 455/427 |
| 5,644,572 | 7/1997 | Olds et al. | 455/13.2 |

*Primary Examiner*—Nguyen Vo
*Attorney, Agent, or Firm*—Keith A. Chanroo

[57] ABSTRACT

A selective call receiver (24) that receives signals transmitted by orbiting satellites (A, B) uses certain information transmitted by the satellites to calculate an estimate of its position. Using that estimate and other information, the selective call receiver (24) is able to save power by disregarding certain information contained in transmitted signals that are not intended for it.

16 Claims, 10 Drawing Sheets

LOCATION METHOD FOR A ELECTIVE CALL RECEIVER OPERATING IN A SATELLITE COMMUNICATION SYSTEM

CROSS REFERENCE TO RELATED APPLICATION

This Application is related to U.S. application Ser. No. 08/842,103 filed Apr. 28, 1997.

FIELD OF THE INVENTION

This invention is directed generally to Selective Call Receivers (SCR's) capable of receiving signals transmitted from orbiting satellites.

BACKGROUND OF THE INVENTION

A satellite communication system uses satellites in low earth orbit to transmit messages and other signals to SCR's located on or near the surface of the earth. Each satellite can transmit multiple beams of RF (Radio Frequency) energy, with each beam being directed to a different geographic area. Each beam carries scheduling information that tells receiving SCR's when and where to start decoding frames which may contain messages for them.

An SCR generally receives and decodes signals from several beams, some of which may be intended for geographic areas outside the SCR's service area and which contain no messages for that particular SCR. Nevertheless, the SCR will decode the scheduling information contained in all received beams even though one or more of the received beams does not contain scheduling information intended for that SCR. As a result of decoding scheduling information intended for other SCR's, the SCR is erroneously directed to look for messages that are intended for others, thus wasting the SCR's battery life. Battery life (and message reliability) could be improved if an SCR could disregard scheduling information transmitted by beams which are intended to serve geographic areas relatively remote from the SCR's position.

DESCRIPTION OF THE PREFERRED EMBODIMENT

A satellite communication system is described in U.S. Pat. No. 5,613,194 entitled "Satellite Based Cellular Messaging System and Method of Operation Thereof", the teachings of which are incorporated herein by reference. It is assumed that the SCR's discussed herein are operating within that type of satellite communication system and using the signaling protocol described therein, although other signaling protocols could be used.

In such a satellite communication system, the surface of the earth is divided into Logical Delivery Areas, referred to herein as LDA's. There are 26,631 sequentially numbered LDA's, each with a diameter of about 150 km (kilometers). At any given point in time, an SCR will be in one such LDA, and it can roam from one LDA to another. With this invention, an SCR is able to determine which LDA it is in; i. e., its current position.

In the satellite communication system, the surface of the earth is encircled by 155 imaginary lines called Rows, analogous to latitudes. The location of each LDA can be identified by the Row it occupies and its position in the Row. For example, LDA No. 13,449 is located at Row 78, Position 266.

Figure 1:
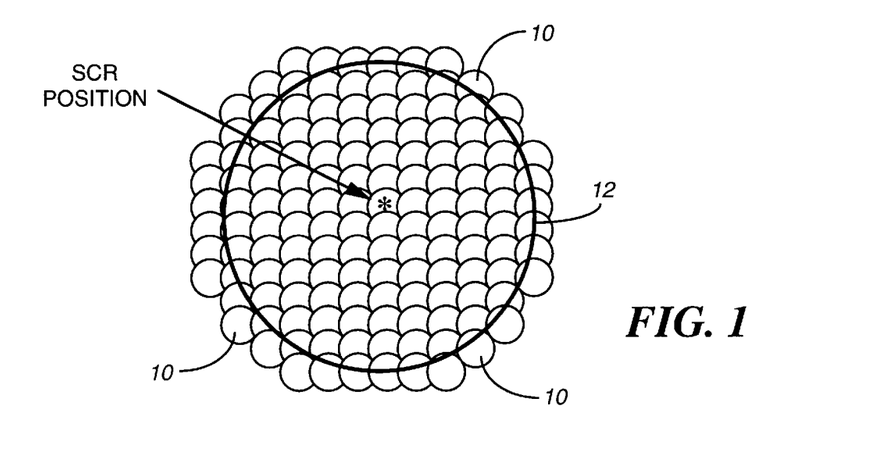
FIG. 1 illustrates a pattern of Logical Delivery Areas that are illuminated by a beam from a satellite.

Referring to FIG. 1, several partial Rows of LDA's 10 are shown. A SCR is indicated as being located in one of the LDA's 10. FIG. 1 also illustrates a beam pattern 12 that is projected by an RF (Radio Frequency) beam emanating from an orbiting satellite. Each such beam pattern typically covers a service area that encompasses approximately 30 LDA's, an area that is equivalent to approximately 706,800 square km. The size of the area covered by a beam pattern can vary, depending on a beam's signal strength contour.

Figure 2:
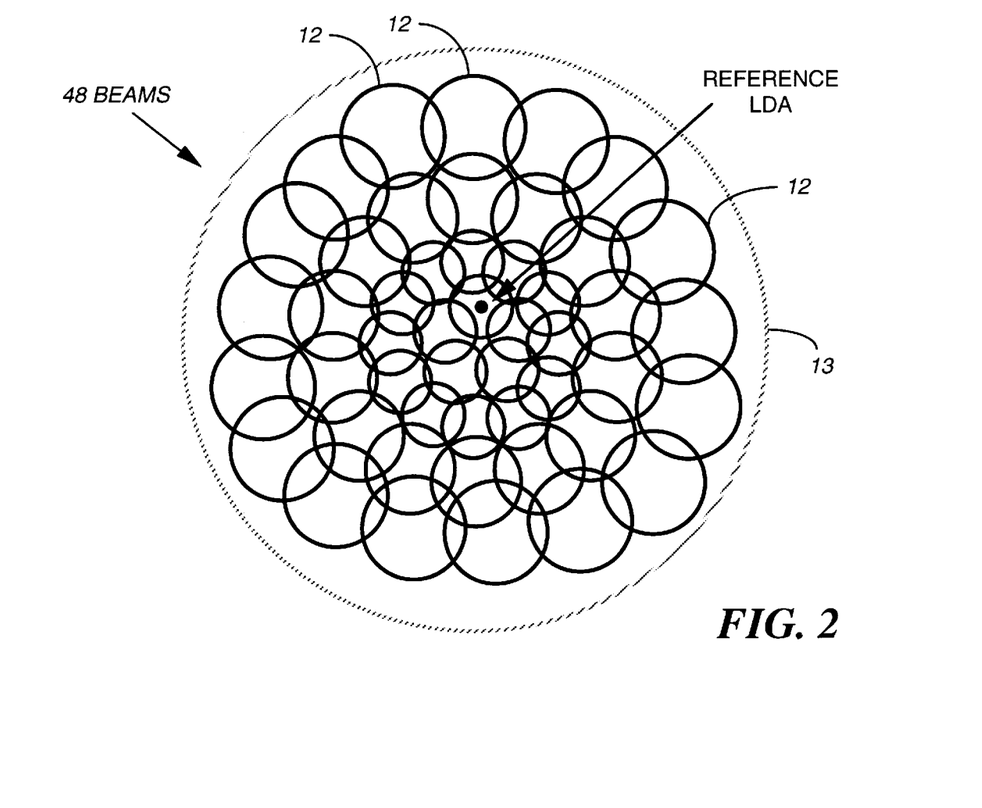
FIG. 2 shows a satellite footprint that is composed of forty-eight beams.

There are 48 such beam patterns created by 48 beams that are transmitted by each satellite in the communication system. These 48 beams are transmitted one-at-a-time over a period of about 4 seconds, collectively creating a footprint 13, as shown in FIG. 2, that sweeps across the earth with a radius of approximately 3250 km.

Each one of the 48 beams transmits information that identifies a reference LDA—an LDA that is located at or near the center of the footprint 13. The identity of the reference LDA is used by a SCR, as described later, to help determine its actual location, or "home" position.

Referring back to FIG. 1, a SCR at the indicated location within the beam pattern 12 receives signals not only from the beam that created beam pattern 12, but also from other adjacent and remote beams (not shown) whose energy spills over into the area shown in FIG. 1. The remote beams probably do not carry information intended for the SCR located in FIG. 1. However, if the spill-over energy from those remote beams is sufficiently large, the SCR in FIG. 1 will receive and decode signals carried by the remote beams. The reason this can cause a problem is best explained by referring to FIG. 3 which shows the signaling protocol used in the satellite communication system.

Figure 3:
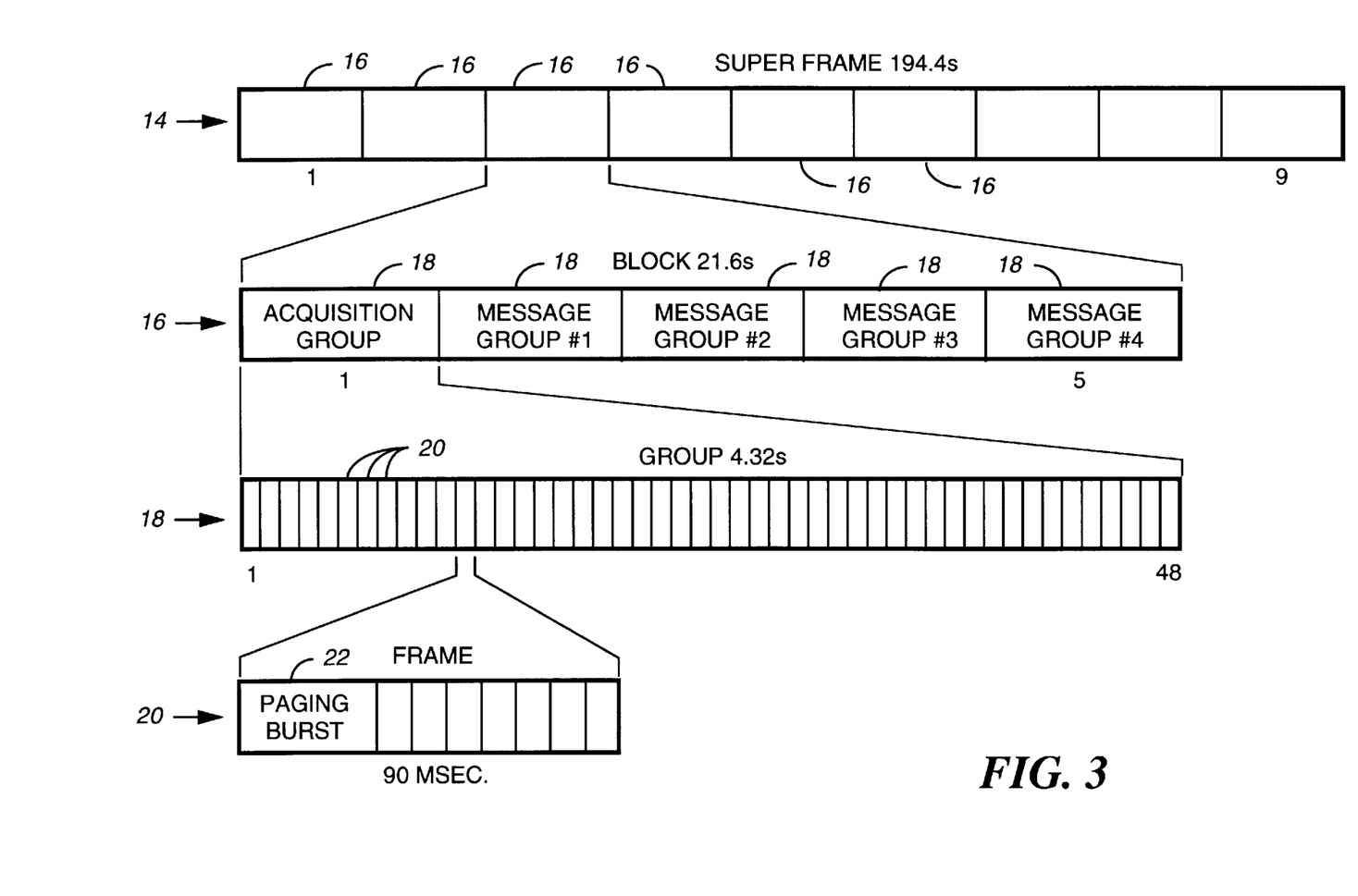
FIG. 3 is a diagram illustrating a signaling protocol that is used in the satellite communication system discussed herein.

The illustrated protocol has a framing structure with a four-level timing hierarchy. The highest level of this hierarchy is a 194.4 second (2160 frames) superframe 14. The superframe 14 comprises nine blocks 16 of 21.6 seconds (240 frames) each. Each block 16 comprises 5 groups 18 of 4.32 seconds (forty-eight frames). The first group of each block 16 is an Acquisition Group that contains 48 frames 20 of scheduling information for SCR's known to be located within the area being served. That scheduling information tells those SCR's where to look for messages within four subsequent message groups. Each of the 48 frames is transmitted by a different one of the 48 beams that are included in each beam pattern 13 (FIG. 2). Finally, each frame 20 includes a simplex message time slot 22, typically used as a paging burst having a duration of 20.32 ms. The remainder of the frame 20 is typically used for cellular telephone service.

Each SCR is active during one of the blocks 16. When an SCR becomes active, it synchronizes itself to the signaling protocol and decodes the Acquisition Group to determine which particular message groups to monitor for its messages. All SCR's that are active during a particular block 16 attempt to decode the Acquisition Group in that block and, if so directed, to look for messages within the message groups within that block.

In transmitting blocks of information, each beam includes information intended for SCR's that are known to be located in an area served by the beam. (When an SCR roams, the user is expected to notify the system of his new location, and the system stores that information). For example, if a message is intended for an SCR known to be located in a service area that includes the area shown in FIG. 1, then the Acquisition Group frame transmitted by beam pattern 12 would include scheduling information directing that SCR to the appropriate message group to find its message. However, other Acquisition Group frames are transmitted in remote beams (not shown) whose energy spills over into the area shown in FIG. 1. Consequently, an SCR located in FIG. 1 will receive and decode instructions in Acquisition Group frames transmitted by the remote beams. Further, the SCR will try to decode information (look for a message) in frames of message groups transmitted by the remote beams. This unnecessary decoding of data that is not intended for it reduces the SCR's battery life.

An SCR that operates according to this invention determines its location accurately enough to disregard scheduling information broadcast by remote beams. The invention enables an SCR to determine that it is located within a specific LDA, so the SCR can decode only information that is carried by a set of beams serving its localized geographic area. Remote beams carrying information for other SCR's that are located elsewhere are ignored, thereby extending the SCR's battery life.

An SCR that operates in accordance with a broad aspect of the invention receives and stores information from multiple beams, including information identifying each beam's frame number and a reference delivery area. The SCR determines a home region within which it is likely located, based at least in part on the identified frame numbers and reference delivery area. When the SCR receives beams from more than one satellite (the usual situation), the SCR determines the travel time of at least one beam from at least two different satellites. The SCR then selects, from within the home region, an estimated home position that is consistent with the beams' travel times.

Figure 4:
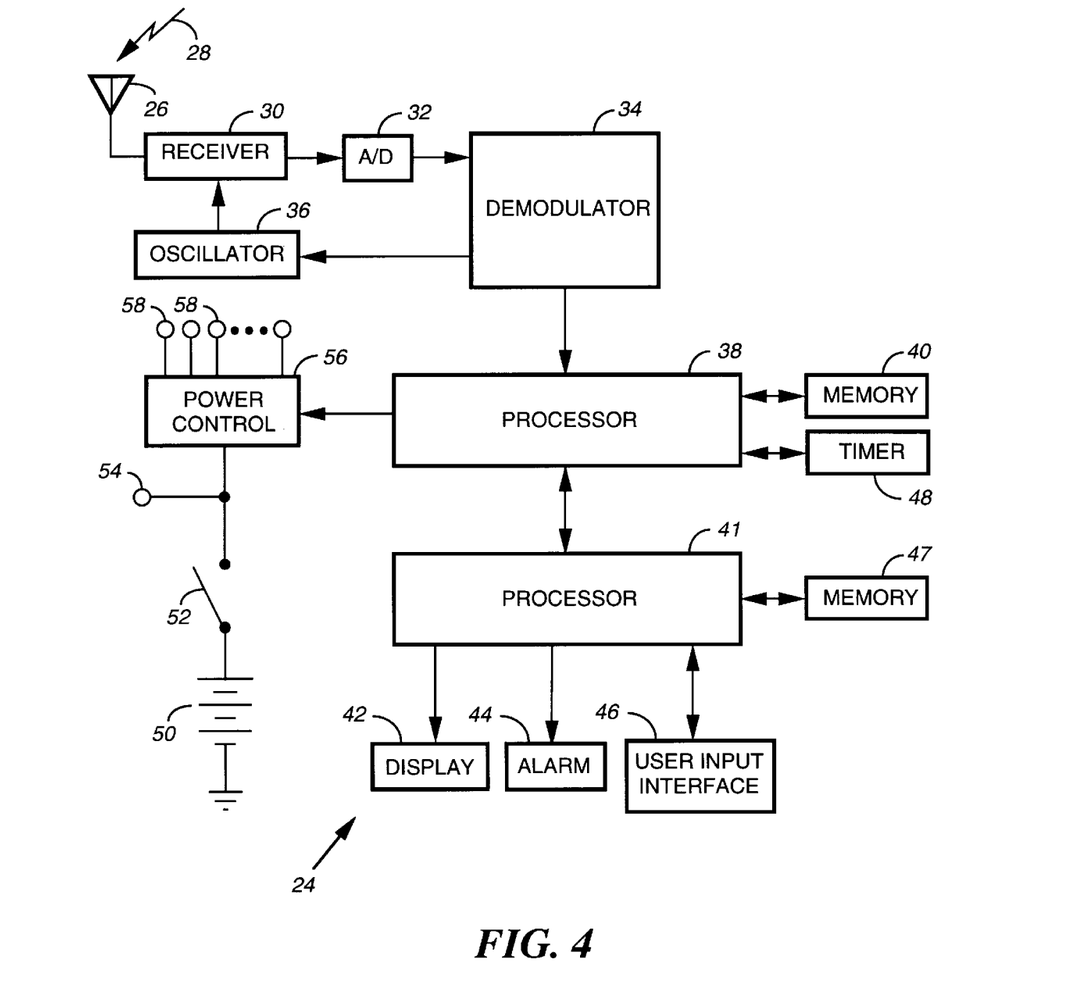
FIG. 4 is a block diagram of a SCR that operates in accordance with the invention.

A SCR that is able to determine its home position in accordance with the invention is shown in FIG. 4. The illustrated SCR 24 includes an antenna 26 through which a communication link 28 is established with satellite transmitters. Antenna 26 feeds a receiver 30 which includes RF (Radio-Frequency), mixing, and intermediate-frequency stages (not shown) as needed to convert RF signals to baseband. Receiver 30 couples to an analog-to-digital (A/D) converter 32 which digitizes the baseband signal, and A/D converter 32 couples to a digital demodulator 34 that extracts digital data from the digitized baseband signal.

The demodulator 34 recovers Quaternary or Binary phase shift keying data included in the transmission from link 28. Demodulator 34 also supplies a feedback signal to control an oscillator 36. Oscillator 36 provides an oscillation signal that receiver 30 uses in converting the RF signal to baseband.

Demodulator 34 feeds its digital data output to a processor 38 which may be a TMS320C54x digital signal processor made by Motorola, Inc. Processor 38 couples to a memory 40 which permanently stores certain data, including computer programs that instruct SCR 24 to perform various procedures, including calculating its position. The memory 40 also stores temporary data which changes as a result of operating the SCR. A timer 48 synchronizes the processor 38 with system timing and enables the processor to keep track of the time of day.

Another processor 41, such as a 68HC11 made by Motorola, Inc., couples to various peripheral devices, such as a display 42, an alarm 44, a user input interface 46, and a memory 47. Processor 41 controls display 42 to show data to a user of SCR 24, and the same processor controls alarm 44 to audibly and/or visibly indicate the receipt of a message addressed to SCR 24. Processor 41 receives user input, preferably through the operation of keys or buttons (not shown) through interface 46.

SCR 24 is energized by a battery 50 which couples through a power switch 52 to a terminal 54 and to a power control section 56. Power control section 56 switches power to terminals 58 in accordance with commands received from processor 38. Terminal 54 supplies power to at least timer 48, while terminals 58 supply power to the remaining components of SCR 24.

SCR 24 is de-energized when switch 52 is open, and it is fully energized and operational when switch 52 is closed and when power is routed to all of terminals 58. SCR 24 may also operate in an energized but low power sleep mode when power is not routed to one or more of terminals 58, but switch 52 is closed to route power through terminal 54 to at least timer 48.

Further description of the SCR 24 is available in the above-referenced Patent. For purposes of this invention, it suffices to add that the processor 38 causes the SCR 24 to operate in accordance with the invention by virtue of a computer program and other information that is stored in the memory 40. The operation of the computer program will now be described, starting with the flow chart shown in FIG. 5.

Figure 5:
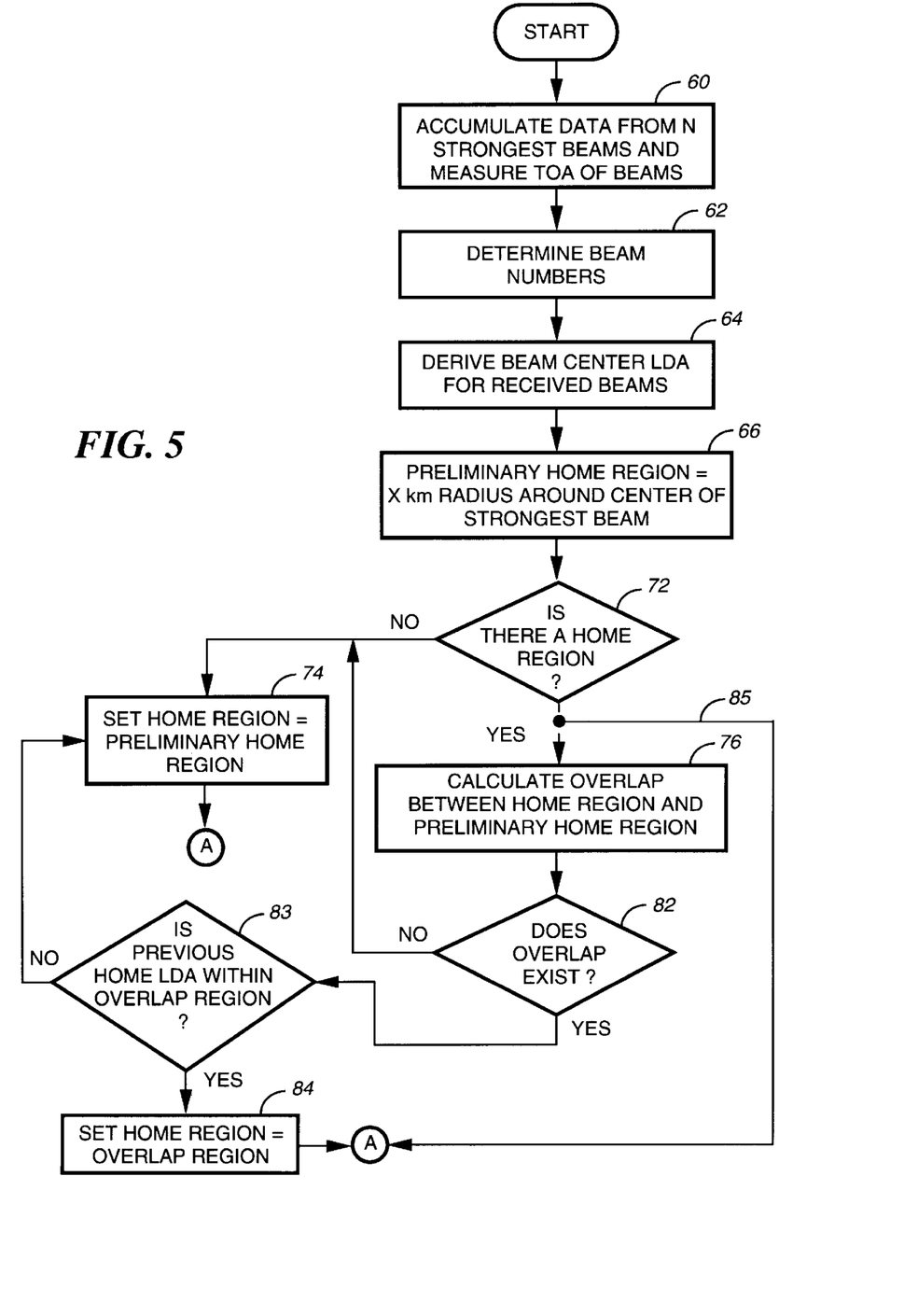
FIGS. 5 and 6 are flow charts showing how the SCR's processor is programmed to cause the SCR to operate in accordance with the invention.

After the start instruction, step 60 causes the SCR to accumulate and store data from the N strongest beams received by the SCR, and to measure the TOA (Time of Arrival) of each beam (the use of the TOA's is discussed later). In executing this step, the SCR may receive a few or many of the 48 frames 20, depending on conditions. The SCR retains the data contained in the N frames that are received with the strongest signal strength. The value of N depends on the storage capacity of the SCR's memory 40. Choosing N equal to 12 should provide acceptable performance.

The data that is accumulated per step 60 is found in the frames 20 of the Acquisition Group (FIG. 3). The information carried by each such frame includes the reference LDA of the transmitting satellite, the frame number, the direction in which the satellite is moving with respect to earth (North or South) and a visit schedule. The visit schedule contains scheduling information that directs the SCR to look for a message located within one or more active message groups in the current block.

Each of the 48 beams transmitted by a satellite has a number. In the next step 62, the SCR determines the number of each of the N strongest beams identified in step 60. This determination is based on the fact that a relationship exists between each frame in an Acquisition Group and the beam that transmitted the frame. Two look-up tables, one for north bound satellites and one for south bound satellites, are located in the SCR's memory 40. These look-up tables contain the beam number used to transmit each frame in an Acquisition Group. Hence, for each of the frame numbers identified in step 60, the SCR uses one of the look-up tables to identify the corresponding beam number.

Up to this point, the SCR has information identifying the reference LDA (FIG. 2) and the identifying numbers of the N strongest beams. Using this information, one can determine the distance between the known reference LDA and the LDA located at or near the center of each of the N beams. This is accomplished by storing, in the memory 40, a list of offsets, in row and position form, between a reference LDA and the LDA closest to the peak of a beam's signal strength pattern. Per step 64, the SCR looks up the appropriate offsets and determines the identity of an LDA closest to the center of each of the N beams.

In the next step 66, the SCR determines a preliminary home region in which the SCR is likely to be located. This region is referred to as "preliminary" because the region's size may optionally be reduced at a later point to more definitely define the home position of the SCR.

Figure 7:
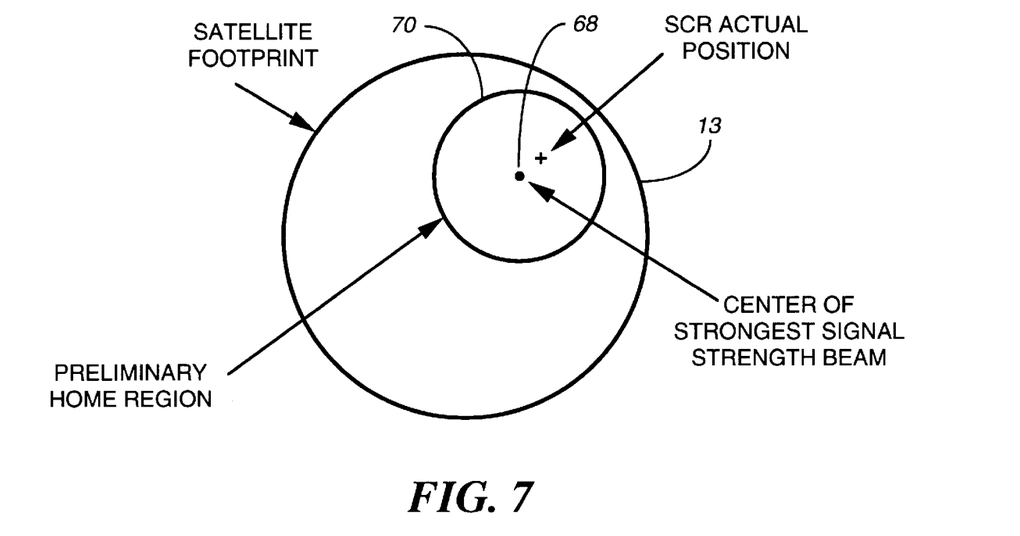
FIG. 7 demonstrates how the SCR is located within a preliminary home region within a satellite's footprint.

Preferably, the preliminary home region is a circular region surrounding the LDA that is located at or near the center of the strongest beam. See FIG. 7 which illustrates the satellite footprint 13, the actual position of the SCR within the footprint, and the LDA 68 (identified in step 64) that is located at or near the center of the strongest of the N received beams. The preliminary home region 70 is a circular area which has a radius of X km around the LDA 68 which is at the center of the strongest beam.

The value of X in step 66 is a selected initial value for the radius of the preliminary home region. This initial value of X is also a predetermined maximum value that is reducible to a predetermined minimum value. For example, the initial value of X may be 1000 km, stored in the SCR's memory 40.

The value of X can be a dynamic value that depends on the reliability of the SCR's estimated position. The value of X is preferably reduced over time if the SCR's estimated position remains nearly the same for some predetermined time period, or if a number of repeated calculations of the estimated position produce substantially similar results. Thus, the value of X can be gradually reduced to a predetermined minimum value, such as 500 km, if the SCR's estimated position continues to remain substantially the same. Once synchronization is lost between the SCR and received signals from a satellite, the calculation of the preliminary home region begins again with the initial, maximum value of X.

Returning to FIG. 5, step 72 asks if there is a home region. A home region, a region where the SCR is likely to be located, may be smaller than the preliminary home region 70, but not larger than region 70, as will be evident after having examined the remaining steps of the flowchart in FIG. 5.

If the program illustrated by the flowchart has been executed previously, a home region will previously have been found. However, if no home region has yet been identified, then the program proceeds to step 74 where the home region is set equal to the preliminary home region that was identified in step 66.

Figure 6:
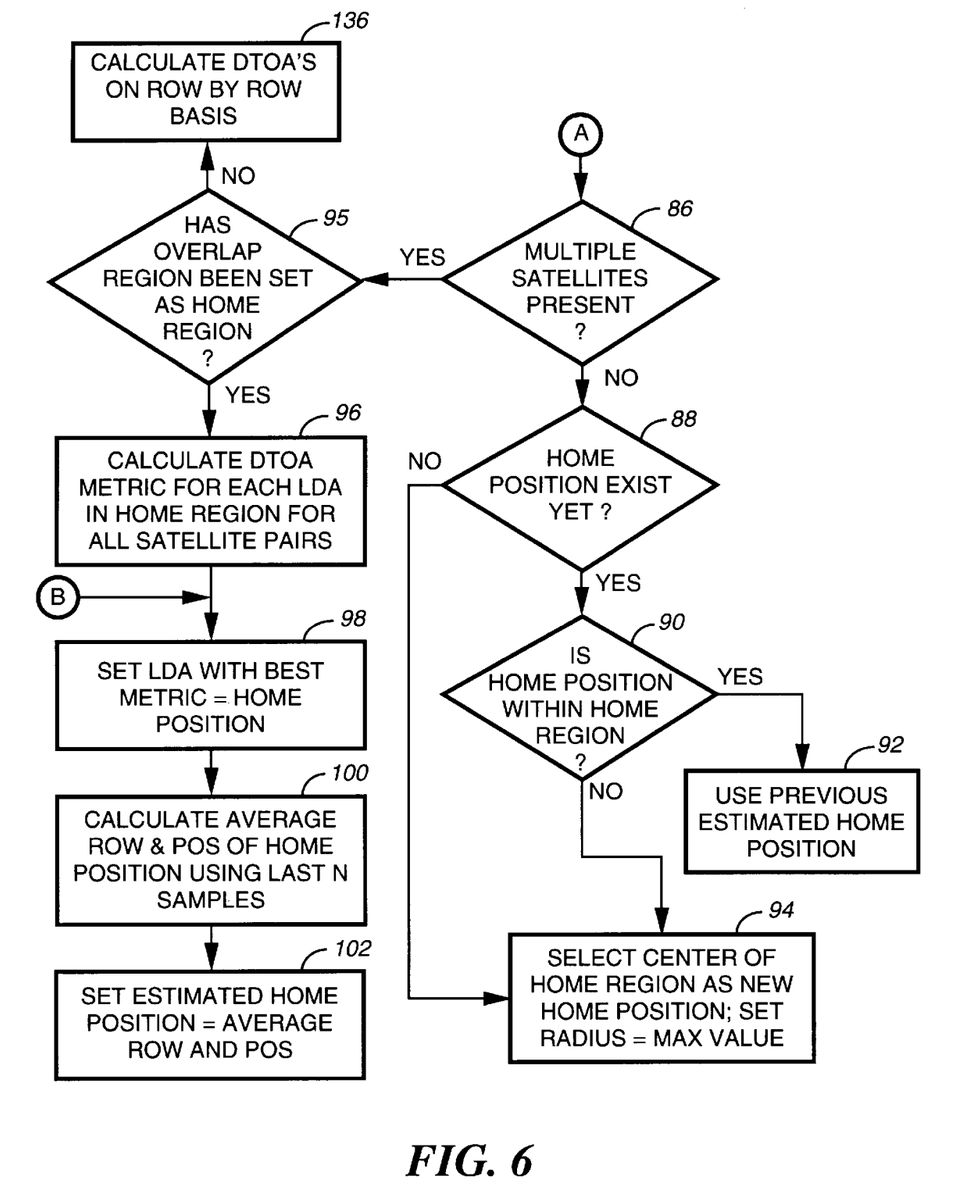

If a home region had been previously identified, the program preferably proceeds from step 72 directly to node A and then to step 86 (FIG. 6). As an alternate option, the program can proceed from step 72 to step 76 where the program calculates the amount of overlap, if any, between the previously identified home region and the preliminary home region determined in step 66.

Figure 8:
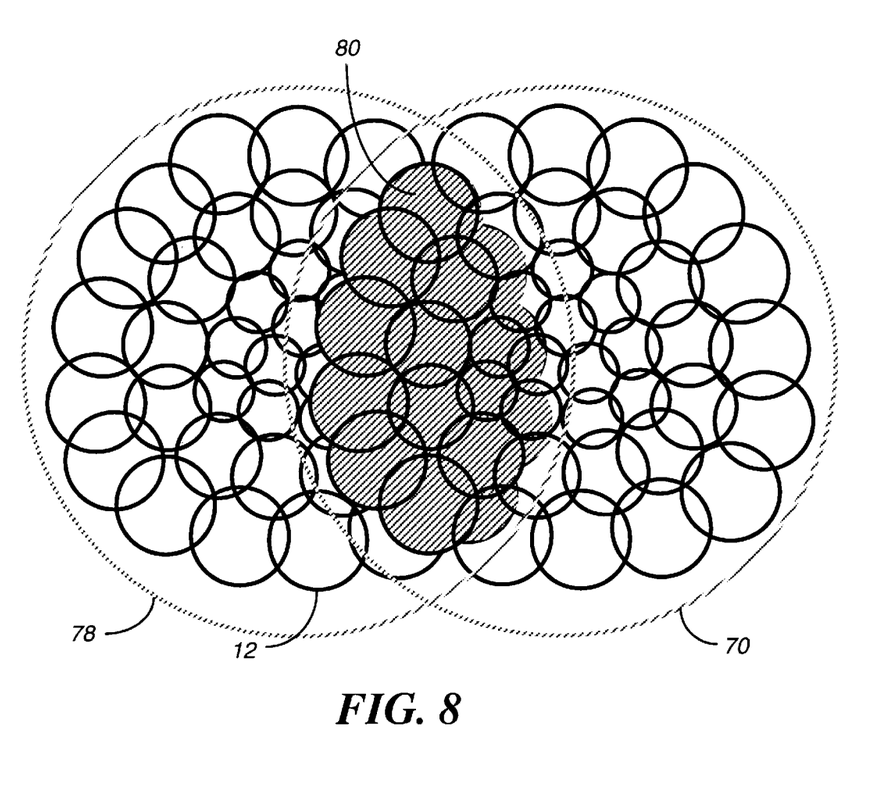
FIG. 8 shows an area of overlap that the SCR seeks between a preliminary home region and a previously identified home region.

FIG. 8 shows a previously identified home region 78 and the preliminary home region 70, both regions being shown as being impinged by a plurality of beams 12. An area of overlap 80 between the regions 70 and 78 is shown as cross-hatched. This is the overlap area that is calculated per step 76.

In the next step 82, the program determines whether an area of overlap was found in step 76. If there is no overlap between the previously identified home region and the preliminary home region, the program returns to step 74. At this step, the preliminary home region determined in step 66 becomes the new home region that is used in subsequent calculations.

If overlap exists when step 82 is executed, the program proceeds to step 83 where a test is performed to determine whether the overlap region has been accurately determined. The ultimate goal of the program is to identify a home position, or home LDA, where the SCR is actually located. Previous passes through the program will have identified such a home LDA. Step 83 determines the accuracy of the overlap region by asking whether the previously identified home LDA is within the overlap region calculated per step 76. The reason for this test is that successive passes through the program can possibly result in an overlap region that is so small that it does not include the home LDA.

If step 83 produces a negative answer, the program returns to step 74 where the home region is set equal to the preliminary home region identified in step 66; the overlap region is not used.

If step 83 produces an affirmative answer, the home region is set equal to the overlap region in the next step 84.

It can be seen that the flowchart of FIG. 5 identifies a home region that is either the preliminary home region found in step 66 (when no overlap exists), or the overlap region calculated in step 76. If there is an overlap region (such as region 80 in FIG. 8), it will likely be smaller than either the preliminary home region 70 or the previously determined home region 78. Therefore, the overlap region will contain fewer LDA's from which to select the SCR's estimated home LDA (the LDA within which the SCR is most likely located), and will require fewer calculations to determine which LDA should be selected as the SCR's home LDA.

The method of selecting a particular LDA as the home LDA depends on how many satellites the SCR receives information from in step 60. If the information received during an Acquisition Group originates from a single satellite, the SCR's estimated home LDA is an LDA that is at or near the center of the home region (as determined by the flow chart in FIG. 5). If the information received per step 60 is from multiple satellites, we use a different, more precise technique in which we determine the travel time to the SCR of at least one beam from each of the multiple satellites and select, from within the home region, an estimated home LDA, or home position, that is consistent with the beam travel times, as described in more detail below.

More specifically, we measure the time of arrival (TOA) at the SCR of beams received from at least one pair of satellites. These two beams are referred to herein as "beam pairs". For each beam pair, we calculate a real differential TOA that corresponds to the difference between measured TOA's of beams in the beam pair. Further, for each LDA in the home region, we calculate a theoretical differential TOA for beam pairs. For the beam pairs, we calculate the difference between the theoretical differential TOA's and the real (measured) differential TOA's. The estimated home position is then selected as the LDA for which the smallest difference exists between theoretical and real differential TOA's. The preferred technique for carrying out the calculations discussed above is illustrated by the flow chart of FIG. 6.

At step 86, the SCR determines whether multiple satellites are present, i.e., whether the SCR received information from more than one satellite during the last Acquisition Group. Because each beam originating from the same satellite includes the reference LDA of that satellite (more precisely, the number of the Reference LDA), the detection of more than one reference LDA during an Acquisition Group can indicate that the SCR received information from more than one satellite. However, because a satellite's beam pattern can move up to about 28 km over the ground during one Acquisition Group, that satellite's reference LDA can change by one row number while the SCR is receiving the Acquisition Group; but a difference of more than one row number indicates that multiple satellites were present during receipt of an Acquisition Group. Therefore, step 86 will find that multiple satellites are present when different frames of a single Acquisition Group include reference LDA's whose row numbers differ by more than one.

If multiple satellites are not present, there is no calculation of beam travel times and the program proceeds to step 88. At this step, a determination is made as to whether a home position has been estimated. If one or more previous passes through the flow charts of FIGS. 5 and 6 have provided an estimated home position, the program proceeds to step 90. Here, the SCR determines whether the previously estimated home position is located within the home region found per the last pass through the flowchart in FIG. 5. If the answer is affirmative, the program proceeds to step 92 which instructs the SCR to use its previously estimated home position as its current estimated home position.

If, when step 90 was executed, the home position was not within the home region, this indicates that an error has occurred, possibly by the corruption's of received data. At the next step 94, the center of the home region is selected as the new home position; and the radius "X" of the preliminary home region (step 66) is set to its maximum value if X is used as a variable, and the next or subsequent passes through the program should find that the estimated home position will be within the home region when step 90 is executed.

Returning to step 86, and assuming that multiple satellites are present, the program proceeds to step 96 to begin the selection of a particular LDA as the SCR's estimated home position. In this step, a DTOA (Differential Time of Arrival) metric is calculated for each LDA in the home region. This is illustrated by the following example.

Assume that the SCR has received the last frame present in an Acquisition Group, and that the SCR determined from the received information that three satellites are present. These three satellites will be referred to as A, B and C. As a beam from each satellite is received, the SCR measures the received beam's TOA at the SCR (as described later), and stores each measured TOA in its memory. This measurement is preferably made in step 60 (FIG. 5).

The SCR knows that its likely position is in its home region, but the home region can contain many LDA's. The SCR calculates, for each LDA in its home region, a metric which indicates the likelihood that LDA represents the actual position of the SCR. The LDA with the best metric is chosen as the SCR's home LDA, or estimated home position.

The way in which a metric is calculated for each LDA will now be described with reference to FIG. 9 which shows more detail of step 96, and with reference also to FIG. 10. First, one LDA within the home region is selected as a Target LDA, and for that Target LDA a metric is calculated. Then, a second LDA is selected as the target LDA, its metric is calculated, and so on until each LDA within the home region has been treated as a Target LDA and a metric calculated for it.

Figure 9:
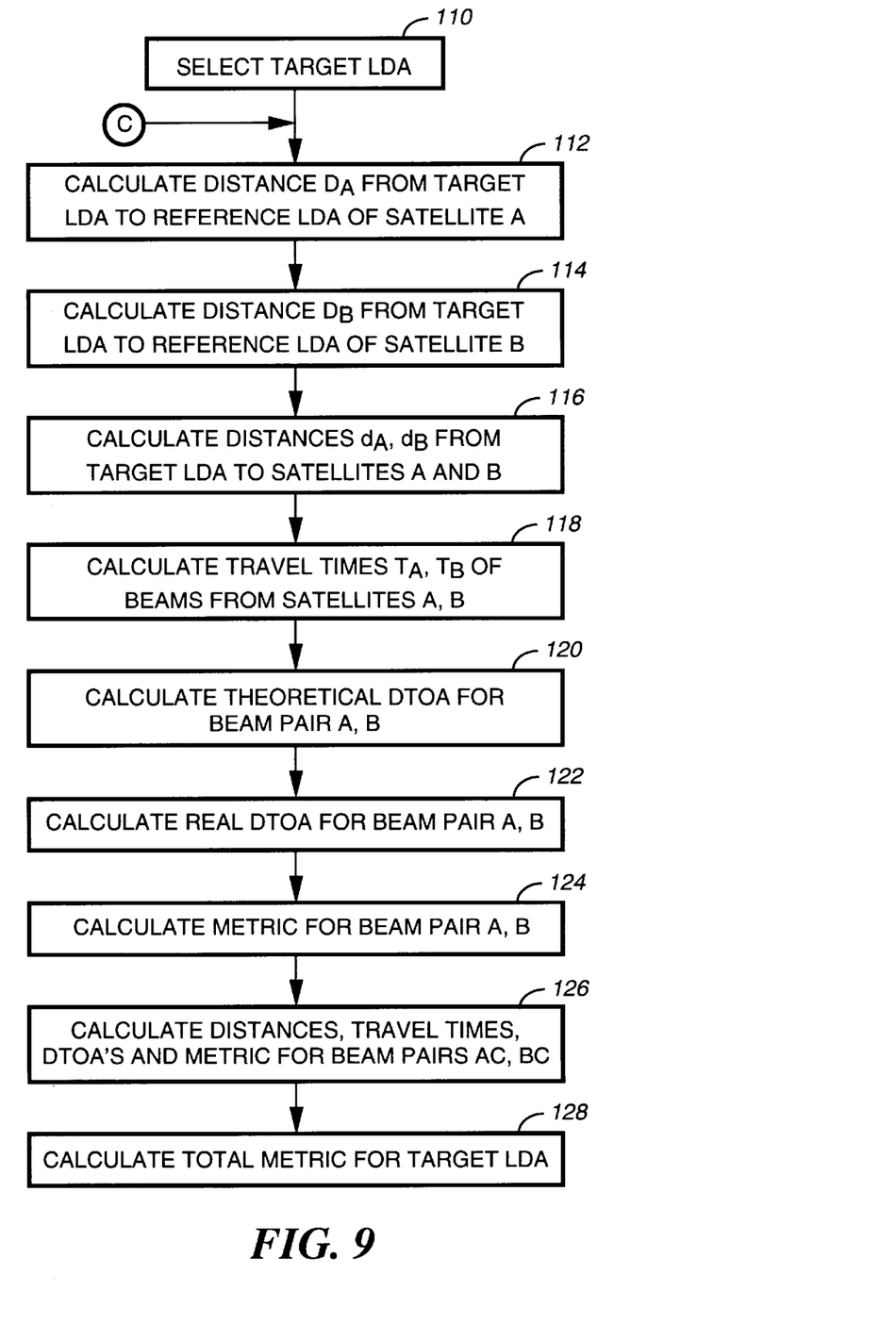
FIG. 9 is a flowchart showing more detail of a step shown in FIG. 6, and more specifically, how the SCR uses the arrival time of beams to determine its position.
Figure 10:
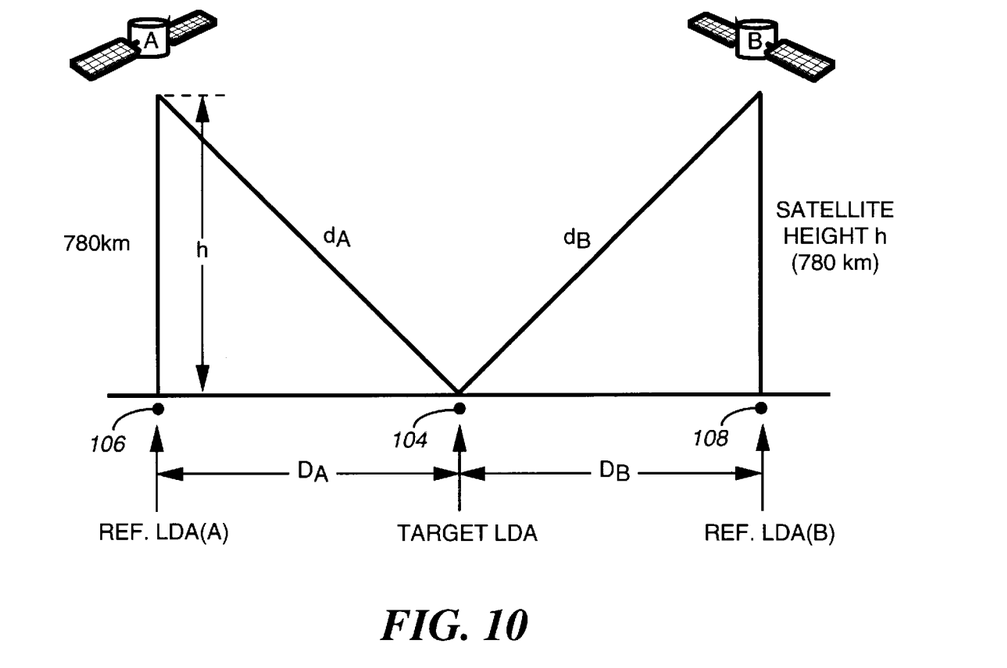
FIG. 10 is a schematic representation of a pair of satellites and certain information used by the SCR to calculate its distance from each satellite.

FIG. 10 illustrates the location of satellites A and B with respect to a Target LDA at 104 (satellite C is not shown). This location 104 is the known position of the LDA that is selected (step 110, FIG. 9) as the first Target LDA. (Any LDA within the home region can be selected as the first Target LDA). The satellite A is a distance $d_A$ from the target LDA and satellite B is a distance $d_B$ from satellite B. Satellite A's known Reference LDA is located at 106; satellite B's known Reference LDA is located at 108. The SCR's memory stores the locations of the centers of all LDA's; therefore, when it learns the number of a satellite's reference LDA, it also knows the location of that LDA's center. Three of those LDA centers are shown at 104, 106 and 108. The height h of each satellite above the earth is known and is substantially constant. For example, each of the illustrated satellites is assumed to be at a height h of 780 km above the earth.

In the next step 112, the distance $D_A$ from the Reference LDA at 106 to the Target LDA at 104 is calculated using conventional great circle distance calculations. In step 114, the distance $D_B$ from the Reference LDA at 108 to the Target LDA at 104 is calculated in the same way.

The distances $d_A$ and $d_B$ between the satellites A, B and the Target LDA at 104 are calculated (step 116) using the Pythagorean Theorem:

$$d_A = \sqrt{780^2 + D_A^2}$$

and $$d_B = \sqrt{780^2 + D_B^2}$$

Per step 118, the travel times $T_A$, $T_B$ of beams from satellites A and B to the target LDA are then calculated as follows:

$$T_A = \frac{d_A}{C} \text{ and } T_B = \frac{d_B}{C},$$

where C is the speed of light. In step 120, the theoretical DTOA (Differential Time of Arrival) of beam pair A, B at the target LDA is calculated as $(T_A - T_B)$.

Recall that the SCR measured and stored the TOA of each beam. If the measured TOA for beam A is called $M_A$, and the measured TOA for beam B is $M_B$, then $(M_A-M_B)$ is the real DTOA at the target LDA for beam pair A, B. See step 122.

Let metric$_{AB}$ be the metric for beam pair A, B at the target LDA. Then, per step 124, the metric for beam pair A, B is:

metric $AB=(T_A-T_B)-(M_A-M_B)$.

For the third satellite C (step 126), the SCR makes the distance calculations from the Reference LDA(C) (not shown in FIG. 10) to the same Target LDA at 104, the theoretical travel time $T_C$, and the theoretical differential travel times $(T_A-T_C)$ and $(T_B-T_C)$. Because the travel times of beams from satellites B and C have been measured, we have the information needed to formulate metrics for beam pairs AC and BC. The metric AC and the metric BC are:

metric $AC=(T_A-T_C)-(M_A-M_C)$, and metric $BC=(T_B-T_C)-(M_B-M_C)$.

If there is a fourth satellite D present, we also formulate metrics for beam pairs AD, BD, and CD, as well as for any other beam pairs present.

In the next step 128, we calculate a Total Metric for the Target LDA (assuming for this example that only satellites A, B and C are present):

$$\text{Total Metric} = \frac{(\text{metric } AB)^2 + (\text{metric } AC)^2 + (\text{metric } BC)^2}{\text{no. of beam pairs (3)}}$$

After the calculations described above have been completed for a selected Target LDA, a different LDA in the home region is selected as a new Target LDA, and a Total Metric is calculated for that new Target LDA. Preferably, this process is repeated for each LDA in the home region so that each such LDA has its own Total Metric.

Returning to FIG. 6, the program now proceeds from step 96 to step 98 where we select the LDA with the best Total Metric as the estimated home LDA, i.e., the LDA in which the SCR is most likely located. This is preferably accomplished by comparing the Total Metrics that have been calculated for LDA's in the home region, and choosing the one LDA whose total Metric has the smallest numeric value. That chosen LDA then becomes the SCR's estimated home LDA.

The home LDA can be considered as the SCR's final estimated home position, and it can be re-calculated after receipt of each Acquisition Group, discarding previously calculated home LDA's. Preferably, however, the SCR calculates a new home LDA each time it receives a new Acquisition Group, and it saves a number of previously calculated home LDA's. Each such home LDA has a row and position value. After calculating a new home LDA, the SCR averages the "N" row values and the "N" position values of the last "N" home LDA's to provide an average row and position value that is used as the SCR's final estimated home position. Alternately, one may use, as the final estimated home position, the home LDA which occurs most often in a given time period.

Figure 11:
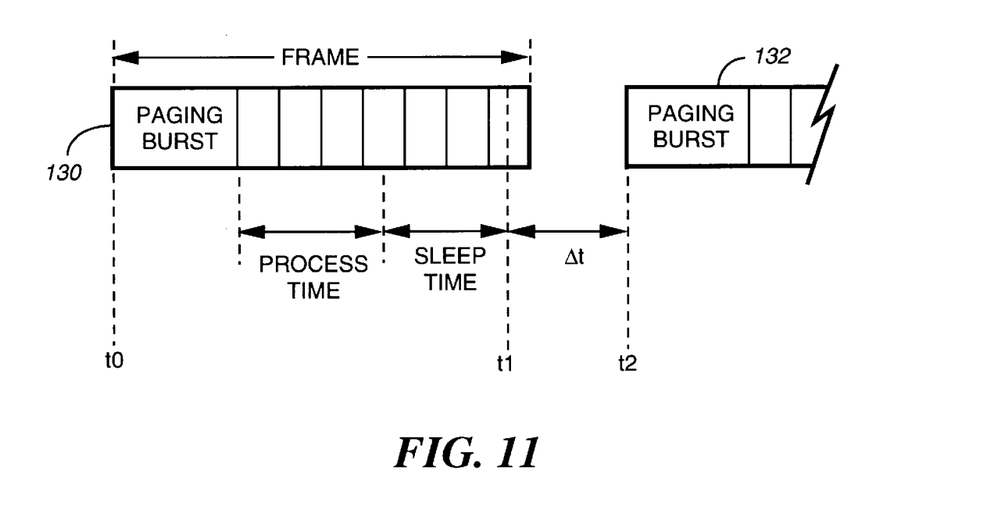
FIG. 11 illustrates a pair of Acquisition Group frames received by the SCR, and certain time intervals that are helpful in explaining the SCR's operation.

The preferred technique for measuring the TOA of a beam will now be explained with reference to FIG. 11. A pair of frames 130 and 132 are shown, each of which occur during an Acquisition Group. Each of the illustrated frames begins with a paging burst followed by process time during which the SCR processes information received during the paging burst. The next period, sleep time, allows the SCR to turn off much of its circuitry to reduce the current drain on its battery.

At time t1, the SCR turns on its receiving circuitry to insure that it will be warmed up and ready to operate when the next paging burst is received. The SCR determines that the time t1 has arrived by counting from time t0, the beginning of the frame 130. The SCR also measures the duration of time interval Δt between t1 and the beginning of the next frame, t2.

The time t2 is variable, and depends on how far the transmitting satellite is from the SCR. If the satellite is directly overhead, t2 will occur relatively sooner, thereby reducing the time interval Δt. Conversely, if the satellite is near the horizon, t2 will occur later and Δt will be larger. Thus, by measuring the time difference Δt between the SCR's turn-on time t1 and receipt of the next frame at t2, the SCR can determine the TOA of the received beam. The TOA information is used in the program of FIG. 9 to more accurately determine the SCR's position when multiple satellites are present.

As discussed earlier, it is not necessary to calculate an overlap region. An alternate technique skips the calculation of an overlap region in step 76, and proceeds directly from step 72 to step 86 (FIG. 6) via path 85 and node A. If multiple satellites are not present (step 86), the program selects a home position (home LDA) by executing steps 88–94 as described previously.

If multiple satellites are present, the program advances from step 86 to step 95. Here, step 95 determines whether the optional overlap calculation was used. Because no overlap region is calculated per this example, the answer to step 95 is negative, and the program proceeds to step 136 where the SCR calculates DTOA's on a row-by-row basis to reduce the number of Target LDA's for which calculations are made.

Figure 12:
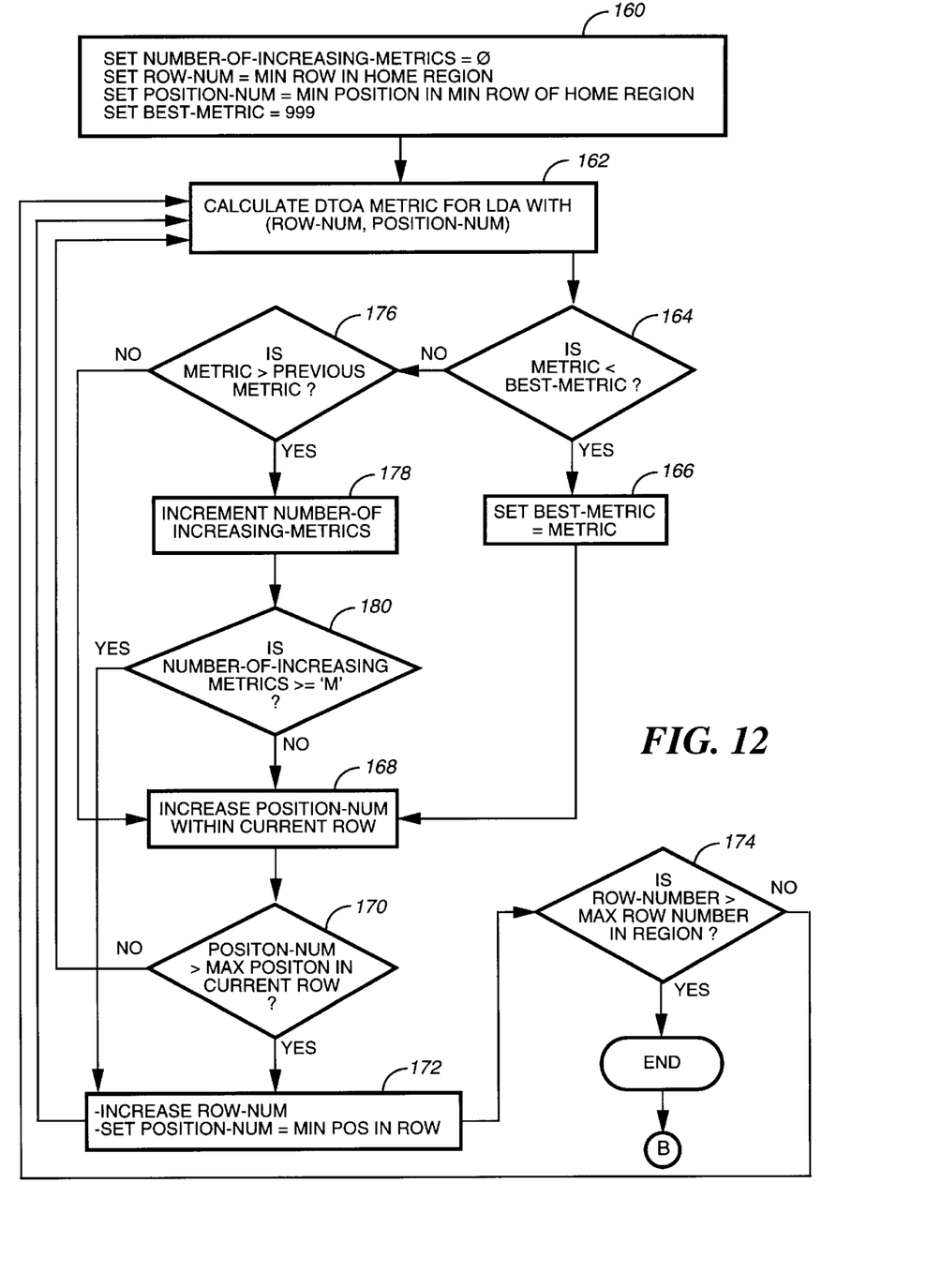
FIG. 12 is a flow chart showing how the SCR's processor may be programmed to more specifically determine its location within its home region without calculating an overlap region.
Figure 13:
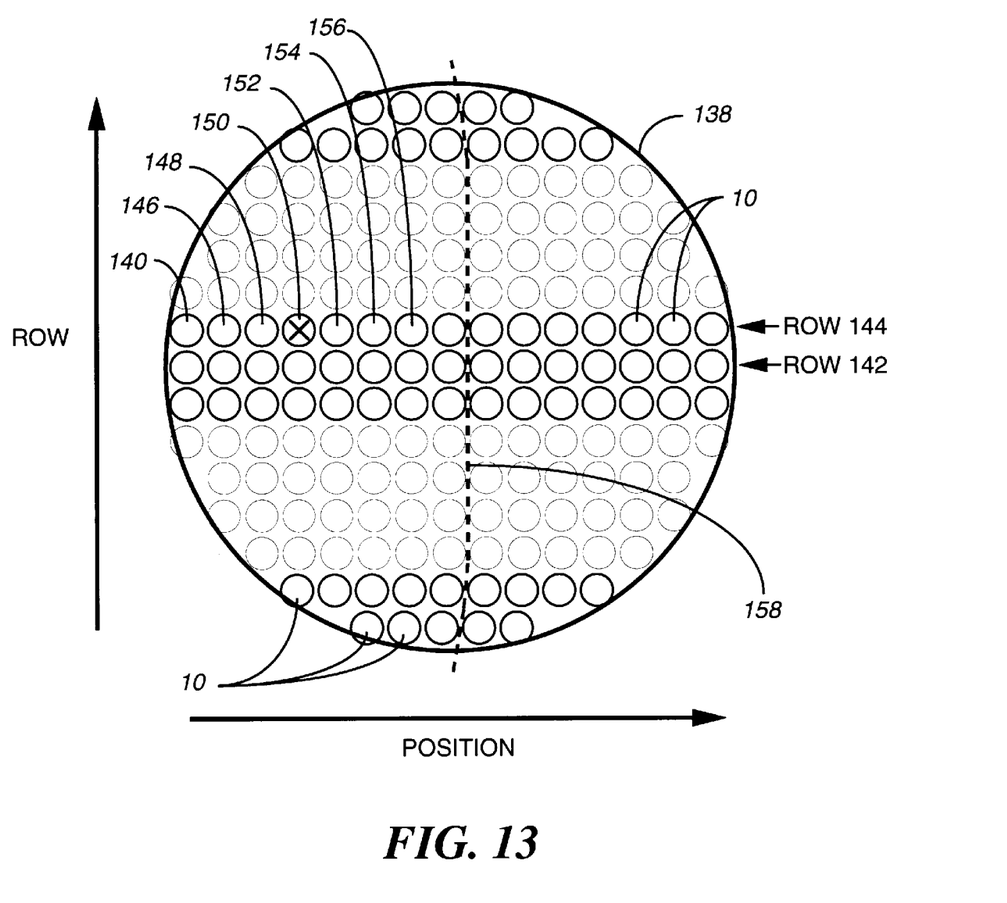
FIG. 13 illustrates a home region containing rows of LDA's, and is useful in explaining how the SCR's estimated actual position is determined per the steps shown in FIG. 12.

The details of step 136 are shown in FIG. 12, and an example of a home region 138 for which DTOA's are calculated is shown in FIG. 13. In FIG. 13, the illustrated home region 138 contains many LDA's 10 for which DTOA metric values are calculated on a row-by-row basis. Each LDA 10 is identifiable by its row number and its position number in its row.

According to this aspect of the invention, the SCR first selects an area (preferably, an LDA) to begin its calculation and, for the selected area, calculates a metric value (the same metric value that is calculated by the steps shown in FIG. 9) that is indicative of the likelihood that the SCR is located in the selected area. Referring to FIG. 13, the SCR may select the bottom (or top) row of LDA's in region 138 to begin its metric calculations, beginning with the first LDA in the selected row and working from left to right (or right to left) across the row until the calculations indicate that the SCR is not likely located among the remaining LDA's in that row. Calculations for that row are then terminated, and the SCR moves to the next adjacent row and repeats the same process for LDA's in that row, and so on until metric calculations have been made for each row of LDA's in the region.

For the example shown in FIG. 13, we assume that metric calculations have been completed for the bottom-most rows in region 138, up through row 142, and that the LDA 140, in row 144, is selected as the next LDA for which a metric will be calculated. Metrics are then calculated for the LDA 140 and for other LDA's in the same row 144 until a predetermined number of LDA's exhibit metric values that indicate a decreasing likelihood that the SCR is located in the predetermined number of LDA's. The calculation of metric values is then terminated for other LDA's in the same row. This process is preferably, but not necessarily, repeated for all rows in the home region, and then the LDA whose metric value is most indicative of the SCR being located therein is chosen as the SCR's most likely position.

Assume that the SCR has chosen the LDA 140 as the initial LDA for which a metric will be calculated in row 144, and that the actual position of the SCR is in LDA 150. Upon completion of the metric for LDA 140, the SCR preferably calculates a metric for the next LDA 146 in the same row, and then for LDA's 148 and 150 in the same row. The numerical values of the metrics should lessen (improve) as the SCR calculates metrics for LDA's 140–150 because the actual location of the SCR is being approached.

The calculation of metrics continues, with the SCR calculating metrics for LDA's 152, 154 and 156. Because we are now moving away from the actual location of the SCR in LDA 150, the numerical values of the metrics should increase, indicating a decreasing likelihood that the SCR is located in LDA's 152–156 and subsequent LDA's in the same row. When a predetermined number of metrics exhibit increasing values, the SCR terminates the calculation of metrics for other LDA's in the same row. Thus, if the predetermined number is selected as three, and the metric values for LDA's 152, 154 and 156 are increasing, then the SCR makes no more metric calculations for LDA's in the row 144.

This process continues for the remaining rows in region 138, with the SCR terminating calculations in each row after three LDA's have been found to have increasing metric values. A dashed line 158 indicates where in each row the SCR terminated metric calculations for this example. Thus, all LDA's located to the left of the line 158 have had their metric values calculated, whereas no metric calculations are calculated for LDA's located to the right of the line 158. Accordingly, the SCR has skipped calculating metric values for LDA's that are unlikely to contain the SCR, thereby reducing the time required for metric calculations, and extending battery life.

An example of how the SCR's processor may be programmed to implement the row-by-row calculation of metrics is shown by the flow chart of FIG. 12. The first step 160 sets certain initial values that are used in the program and discussed later.

In the next step 162, the SCR calculates the DTOA metric for an LDA in the home region that is located at a specified row number and position number. On the first pass through this program, step 160 sets the row number to the minimum row number in the home region, and the position number to the minimum position in the minimum row. The actual metric calculations are made per the steps shown in FIG. 9, entering the flow chart of FIG. 9 at node C (step 110 is skipped).

The next step 164 asks if the value of the last metric calculated in step 162 is less than the value of a variable called "best-metric". In step 160, this variable was initially set to the value of 999. If the answer found at step 164 is affirmative, the program proceeds to step 166 where "best-metric" is set equal to the value of the metric calculated in step 162. This completes the processing of the first LDA in the first row.

Next, the program increments the variable "position-num" to select the next LDA in the same row (step 168), and then determines whether the incremented "position-num" is greater than the maximum position number in the current row (step 170). If the answer is negative, the program proceeds from step 170 back to step 162 to calculate the metric for the next LDA in the current row. However, if the answer to step 170 is affirmative, this indicates that the last LDA in the current row has been processed, and the program proceeds to step 172. At this step, the variable "row-num" is incremented and the "position-num" is set to the number of the minimum LDA position in the next row.

The next step 174 determines whether the last row in the home region has been processed. If one or more rows remain, the program returns to step 162 to continue calculating metrics for LDA's in the current row. Otherwise, the program ends.

Returning to step 164, if the value of the last calculated metric is less than the value of the variable "best-metric", the program proceeds to step 176. Here, the program asks whether the value of the last-calculated metric exceeds the value of the previous metric value. If the answer is negative, the program advances to step 168. If the answer at step 176 is affirmative, this indicates that the current LDA is probably farther away from the SCR's actual position than the last LDA in the current row, and the program proceeds to step 178. At this point, a variable "number-of-increasing-metrics" is incremented by one. This indicates that we have encountered at least one LDA (in the current row) whose metric value has increased compared to the value of the most previous LDA.

In the next step 180, the program determines whether the number of LDA's with increasing metrics exceeds a predetermined number "M" (M had a value of three for the example illustrated by FIG. 13). If the answer is affirmative, we do not calculate metrics for any more LDA's in the current row, and the program proceeds through steps 172, 174 and 162 for selecting and processing the first LDA in the next row. If, at step 180, we had not yet encountered "M" LDA's with increasing metric values, the program would proceed through steps 168–174 and back to step 162 to process the next LDA, either in the current row or the first LDA in the next row.

The process shown in FIG. 12 continues until all rows of LDA's in the home region have been processed, at which point the answer to step 174 will be affirmative, and the calculation of metrics ends. We proceed via node B to step 98 in FIG. 6. At this point, steps 98–102 are executed to select a final estimated home position.

With this invention, an SCR can reliably determine its approximate location. Knowing its location, the SCR can select a subset of received beams which carry scheduling information designated for the SCR's geographic area. This allows the SCR to calculate a composite visit schedule containing only the frames most likely to contain messages for the SCR. Consequently, the SCR's battery life is improved without reducing the probability of receiving its messages.

Although the invention has been described in terms of a preferred embodiment, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a communication system in which orbiting satellites illuminate portions of the earth with beams of RF energy, each beam being activated during an assigned frame and transmitting information identifying its frame number and a reference delivery area, a method for a selective call receiver to estimate its home position, comprising:

a) receiving and storing information received from multiple beams, including information identifying each beam's frame number and reference delivery area wherein the step of receiving is turned off after receiving data of interest included in a received frame and then turned on again at a turn-on time preceding the expected receipt of a next frame, and wherein the time of arrival of a given beam is measured by measuring a time difference between the turn-on time and receipt of the given beam;

b) determining a home region in which the selective call receiver is likely located, based at least in part on the information stored in step a);

c) determining a travel time to the selective call receiver of at least one beam from each of multiple satellites and measuring the times of arrival at the selective call receiver of beams received from at least one pair of satellites (beam pairs) and, for each beam pair, calculating a real DTOA (Differential Time of Arrival) that corresponds to a difference between measured times of arrival of beams in the beam pair; and d) selecting, from within the home region, an estimated home position that is consistent with the travel times determined in step c).

2. A method as set forth in claim 1 wherein step b) includes measuring a signal strength for each received beam, calculating a beam center location for a received beam that has the greatest signal strength, and selecting a preliminary home region that contains the beam center location.

3. A method as set forth in claim 2 wherein the preliminary home region is substantially circular, with a radius that has an initial value, wherein steps c) and d) are executed a plurality of times to generate a plurality of estimated home positions, and wherein when a plurality of the estimated home positions are similar to each other, the radius is reduced to a value smaller than the initial value.

4. A method as set forth in claim 3 wherein the initial value of the radius of the preliminary home region is a predetermined maximum value that is reducible to a predetermined minimum value.

5. A method as set forth in claim 2 wherein the selective call receiver stores a previously determined home region, and further including determining whether an overlap area exists between the previously determined home region and the preliminary home region, and using the overlap area, if any, as the home region.

6. A method as set forth in claim 5 wherein, if no overlap area exists between the previously determined home region and the preliminary home region, the preliminary home region is used as the home region.

7. A method as set forth in claim 1 wherein orbiting satellites illuminate logical delivery areas (LDA's) on the earth, and further including calculating a theoretical DTOA for beam pairs at each LDA within the home region, calculating a difference between the theoretical DTOA's and the real DTOA's of beam pairs, and selecting, as the estimated home position, an LDA for which the smallest difference exists between theoretical DTOA's and real DTOA's.

8. A method as set forth in claim 1 including using the DTOA's to calculate, for each of a plurality of LDA's in the home region, a metric value that is indicative of the likelihood that the selective call receiver is located therein.

9. A method as set forth in claim 1 wherein the travel times of multiple beams are determined, wherein the home region contains rows of LDA's (Logical Delivery Areas) that could each contain the selective call receiver, and wherein, for each of a plurality of LDA's, a metric value is calculated based on the travel times, and wherein the metric value of an LDA is indicative of the likelihood that the selective call receiver is located in the same LDA.

10. A method as set forth in claim 9 wherein metric values for successive LDA's in a selected row are calculated until a predetermined number of areas exhibit metric values that indicate a decreasing likelihood that the selective call receiver is located in the predetermined number of areas, and then terminating the calculation of metric values for other areas in the same row.

11. A method as set forth in claim 10 wherein the estimated home position is an LDA whose metric value is most indicative of the selective call receiver being located therein.

12. In a satellite communication system in which a region has been identified as a probable location of a particular selective call receiver, and wherein the region contains rows of areas which could each contain the selective call receiver, a method of choosing one area as the selective call receiver's most likely location, comprising:

for each of multiple rows in the region:

a) selecting an area, and calculating for the selected area a metric value that is indicative of the likelihood that the selective call receiver is located in the selected area;

b) repeating step a) with other areas in the same row until a predetermined number of areas exhibit metric values that indicate a decreasing likelihood that the selective call receiver is located in the predetermined number of areas, and then terminating the calculation of metric values for other areas in the same row; and c) choosing, as the selective call receiver's most likely position in the region, the area whose metric value is most indicative of the selective call receiver being located therein.

13. In a communication system in which orbiting satellites illuminate logical delivery areas (LDA's) on the earth with beams of RF energy, each beam being activated during an assigned frame and transmitting information identifying its frame number and a reference delivery area, a method for a selective call receiver to estimate its home position, comprising:

a) receiving and storing information received from multiple beams, including information identifying each beam's frame number and reference delivery area;

b) calculating a preliminary home region in which the selective call receiver is likely located, based at least in part on the information stored in step a);

c) comparing the preliminary home region to a previously determined home region that is stored in the selective call receiver, thereby to determine whether an overlap area exists between the previously determined home region and the preliminary home region, and using the overlap area, if any, as a home region;

d) measuring times of arrival at the selective call receiver of pairs of beams (beam pairs) received from a corresponding pair of satellites and, for each beam pair, calculating a real differential time of arrival that corresponds to a difference between measured times of arrival of beams in the beam pair;

e) for each beam pair measured in step d): calculating a theoretical differential time of arrival at each LDA within the home region, and calculating a difference between the theoretical differential time of arrival and the real differential time of arrival; and f) selecting from within the home region, as an estimated home LDA, an LDA at which differences between the theoretical and the real differential times of arrival are minimal.

14. A method as set forth in claim 13 wherein step b) includes measuring a signal strength for each received beam, calculating a beam center location for a received beam that has the greatest signal strength, and selecting a preliminary home region that contains the beam center location.

15. A method as set forth in claim 14 wherein the preliminary home region is substantially circular, with a radius that has an initial predetermined maximum value that is reducible to a predetermined minimum value.

16. In a communication system in which orbiting satellites illuminate logical delivery areas (LDA's) on the earth with beams of RF energy, each beam being activated during an assigned frame and transmitting information identifying its frame number and a reference delivery area, a method for a selective call receiver to estimate its home position, comprising:

a) receiving and storing information received from multiple beams;

b) calculating a preliminary home region in which the selective call receiver is likely located, including measuring a signal strength for each received beam, calculating a beam center location for a received beam that has the greatest signal strength, and wherein the preliminary home region is selected such that it contains the beam center location;

c) comparing the preliminary home region to a previously determined home region that is stored in the selective call receiver, thereby to determine whether an overlap area exists between the previously determined home region and the preliminary home region;

d) if no overlap area exists between the previously determined home region and the preliminary home region, the preliminary home region is used as a home region, and, if an overlap area does exist, the overlap area is used as a home region;

e) measuring times of arrival at the selective call receiver of pairs of beams (beam pairs) received from a corresponding pair of satellites and, for each beam pair, calculating a real differential time of arrival that corresponds to a difference between measured times of arrival of beams in the beam pair;

f) for each beam pair measured in step d): calculating a theoretical differential time of arrival at each LDA within the home region, and calculating a difference between the theoretical differential time of arrival and the real differential time of arrival; and g) selecting from within the home region, as an estimated home position, an LDA at which differences between the theoretical and the real differential times of arrival are minimal.

* * * * *